United States Patent
Nam et al.

(10) Patent No.: US 10,012,785 B2
(45) Date of Patent: Jul. 3, 2018

(54) BACKLIGHT UNIT AND DISPLAY DEVICE INCLUDING THE SAME

(71) Applicant: SAMSUNG DISPLAY CO., LTD., Yongin-si, Gyeonggi-do (KR)

(72) Inventors: Jieun Nam, Seoul (KR); Hyoung-joo Kim, Anyangsi (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 50 days.

(21) Appl. No.: 15/210,408

(22) Filed: Jul. 14, 2016

(65) Prior Publication Data

US 2017/0139100 A1    May 18, 2017

(30) Foreign Application Priority Data

Nov. 17, 2015 (KR) .................. 10-2015-0161341

(51) Int. Cl.
*F21V 9/08* (2018.01)
*F21V 8/00* (2006.01)

(52) U.S. Cl.
CPC ........... *G02B 6/005* (2013.01); *G02B 6/0088* (2013.01); *G02B 6/0091* (2013.01)

(58) Field of Classification Search
CPC . F21V 2200/30; G02B 6/0003; G02B 6/0015; G02B 6/0026; G02B 6/005; G02F 1/133617; G02F 2001/133614
USPC ....................................... 362/293, 601, 606
See application file for complete search history.

(56) References Cited

U.S. PATENT DOCUMENTS

| | | | |
|---|---|---|---|
| 2014/0022819 A1* | 1/2014 | Oh | G02B 6/005 362/607 |
| 2015/0117052 A1* | 4/2015 | Hsu | G02B 6/0043 362/606 |
| 2015/0131028 A1* | 5/2015 | Oh | G02B 6/005 349/65 |

FOREIGN PATENT DOCUMENTS

| | | |
|---|---|---|
| KR | 1020080063598 A | 7/2008 |
| KR | 1020120131069 B1 | 12/2012 |

* cited by examiner

*Primary Examiner* — Elmito Breval
*Assistant Examiner* — Keith Delahoussaye
(74) *Attorney, Agent, or Firm* — Cantor Colburn LLP

(57) ABSTRACT

A display device includes a display panel, a light guide plate, a light source unit, a wavelength conversion sheet which is disposed between the display panel and the light guide plate, and a bottom chassis where the wavelength conversion sheet includes a first portion which covers an upper surface of the light guide plate, the first portion including a first edge extending in a first direction and a second edge facing the first edge, a second portion which extends from the first edge toward the bottom chassis, is coupled to the bottom chassis and covers a first side surface of the light guide plate, and a third portion which extends from the second edge toward the bottom chassis, is coupled to the bottom chassis and covers a second side surface of the light guide plate.

20 Claims, 12 Drawing Sheets

BACKLIGHT UNIT AND DISPLAY DEVICE INCLUDING THE SAME

This application claims priority to Korean Patent Application No. 10-2015-0161341, filed on Nov. 17, 2015, and all the benefits accruing therefrom under 35 U.S.C. § 119, the content of which in its entirety is herein incorporated by reference.

BACKGROUND

1. Field

Exemplary embodiments of the invention relate to a backlight unit providing light having uniform color coordinates, and a display device including the same.

2. Description of the Related Art

A non-light emitting type display device such as a liquid crystal display device, an electrophoretic display device, and an electrowetting display device includes a separate backlight unit for irradiating light. The backlight unit is classified into an edge type and a direct type according to a position of a light emitting diode with respect to a display surface for displaying an image. The edge type backlight unit has an advantage of a thickness less than that of the direct type backlight unit. Thus, the edge type backlight unit is frequently used for portable display devices.

SUMMARY

The invention provides a backlight unit providing light having uniform color coordinates, and also provides a display device having improved display quality.

An exemplary embodiment of the invention provides a display device including a display panel which displays an image, a light guide plate disposed below the display panel, a light source unit which provides light to the light guide plate, a wavelength conversion sheet disposed between the display panel and the light guide plate, the wavelength conversion sheet having a wavelength conversion material for converting a wavelength of the light, and a bottom chassis which accommodates the light guide plate, the light source unit, and the wavelength conversion sheet. The wavelength conversion sheet includes a first portion which covers an upper surface, which faces the display panel, of the light guide plate, the first portion including a first edge extending in a first direction and a second edge facing the first edge and extending in the first direction, a second portion extending from the first edge toward the bottom chassis and coupled to the bottom chassis to cover a first side surface of the light guide plate, and a third portion extending from the second edge toward the bottom chassis and coupled to the bottom chassis to cover a second side surface of the light guide plate.

In an exemplary embodiment, the light guide plate may include a third side surface which connects one end of the first side surface to one end of the second side surface and a fourth side surface which connects an opposite end of the first side surface to an opposite end of the second side surface. The light source unit may face the third side surface.

In an exemplary embodiment, a first hole extending in the first direction and through which the second portion passes and a second hole extending in the first direction and through which the third portion passes may be defined in the bottom chassis.

In an exemplary embodiment, the second portion may be divided into a first cover section which covers the first side surface and a first bonding section passing through the first hole and bonded to a rear surface of the bottom chassis, and the third portion may be divided into a second cover section which covers the second side surface and a second bonding section passing through the second hole and bonded to the rear surface of the bottom chassis.

In an exemplary embodiment, the display device may further include a first coupling member and a second coupling member, which are bonded to the rear surface of the bottom chassis. The first coupling member may bond the first bonding section to the rear surface of the bottom chassis, and the second coupling member may bond the second bonding section to the rear surface of the bottom chassis.

In an exemplary embodiment, the first coupling member may be disposed between the rear surface of the bottom chassis and the first bonding section to bond the first bonding section to the bottom chassis, and the second coupling member may be disposed between the rear surface of the bottom chassis and the second bonding section to bond the second bonding section to the bottom chassis.

In an exemplary embodiment, the first coupling member may cover the first bonding section to bond the first bonding section to the bottom chassis, the second coupling member may cover the second bonding section to bond the second bonding section to the bottom chassis, the first bonding section may be disposed between the rear surface of the bottom chassis and the first coupling member, and the second bonding section may be disposed between the rear surface of the bottom chassis and the second coupling member.

In an exemplary embodiment, a first groove portion and a second groove portion may be defined in the wavelength conversion sheet, and the first groove portion may overlap the first edge and have a recessed shape, and the second groove portion may overlap the second edge and have a recessed shape.

In an exemplary embodiment, each of the first groove portion and the second groove portion may include a plurality of recessed grooves, and the plurality of recessed grooves may be arranged in the first direction, and two recessed grooves, which are adjacent to each other, of the plurality of recessed grooves may be spaced apart from each other.

In an exemplary embodiment, each of the first groove portion and the second groove portion may include a groove extending in the first direction.

In an exemplary embodiment, the wavelength conversion sheet may further include a fourth portion, and the fourth portion may extend from a third edge, which extends in a second direction crossing the first direction, of the first portion to cover the fourth side surface.

In an exemplary embodiment, a third hole extending in the second direction and through which the fourth portion passes may be defined in the bottom chassis.

In an exemplary embodiment, a distance between the third and fourth side surfaces of the light guide plate may be a first distance, and a first width, which is parallel to the first direction, of the wavelength conversion sheet may be greater than the first distance.

In an exemplary embodiment, the light provided by the light source unit may be blue light, and the wavelength conversion material may be a quantum dot.

In an exemplary embodiment of the invention, a display device includes a display panel, a light guide plate disposed below the display panel, a light source unit which provides light to the light guide plate, a wavelength conversion sheet disposed between the display panel and the light guide plate, and a bottom chassis which accommodates the light guide plate, the wavelength conversion sheet, and the light source unit. The wavelength conversion sheet surrounds at least one of side surfaces of the light guide plate and an upper surface of the light guide plate, passes through a hole defined in the bottom chassis, and is coupled to the bottom chassis.

In an exemplary embodiment, the side surfaces of the light guide plate may include a light incident surface facing the light source unit, an opposite surface facing the light incident surface, a first side surface which connects the light incident surface to the opposite surface, and a second side surface facing the first side surface. The wavelength conversion sheet may cover the first side surface and the second side surface to extend toward the bottom chassis.

In an exemplary embodiment, a distance between the light incident surface and the opposite surface may be a first distance, and a first width, which is parallel to the first direction, of the wavelength conversion sheet may be greater than the first distance.

In an exemplary embodiment, the display device may further include a coupling member bonded to the rear surface of the bottom chassis. The coupling member may bond the wavelength conversion sheet passing through the hole to the rear surface of the bottom chassis.

In an exemplary embodiment of the invention, a backlight unit includes a light source unit which generates light, a light guide plate which guides the light provided from the light source unit, an optical sheet which surrounds at least three surfaces of the light guide plate, and a bottom chassis which accommodates the light source unit, the light guide plate, and the optical sheet, the bottom chassis being coupled to the optical sheet.

In an exemplary embodiment, at least two recessed patterns each of which extends in a predetermined direction may be defined in the bottom chassis, and a portion of the optical sheet may be accommodated in each of the recessed patterns to couple the optical sheet to the bottom chassis.

BRIEF DESCRIPTION OF THE FIGURES

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
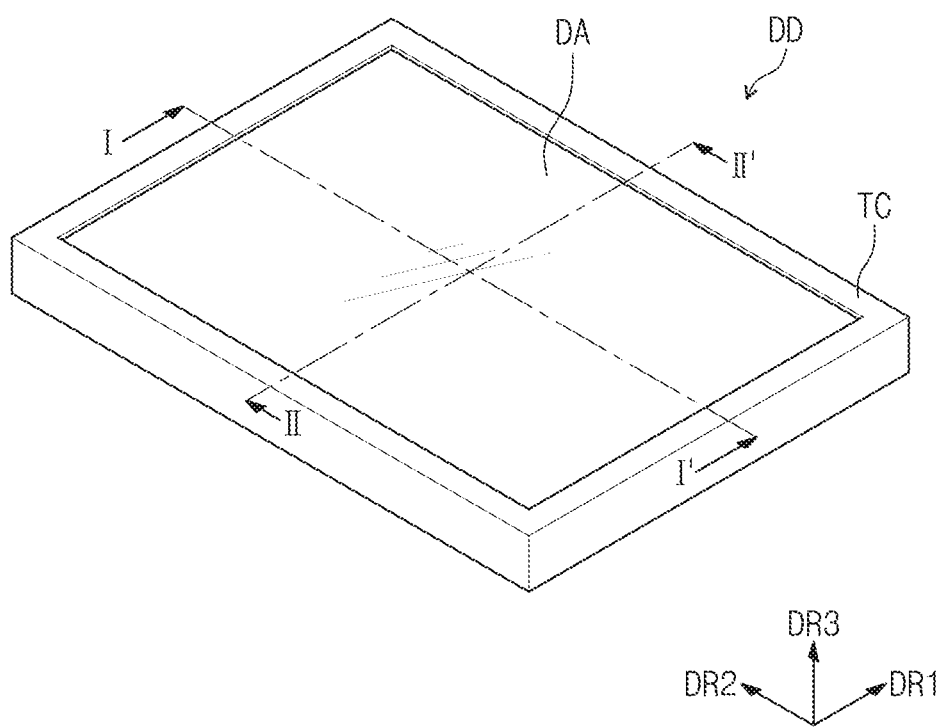
FIG. 1 is a perspective view of an exemplary embodiment of a display device according to the invention.

Since the invention may have diverse modified embodiments, preferred embodiments are illustrated in the drawings and are described in the detailed description of the invention. However, this does not limit the invention within specific embodiments and it should be understood that the invention covers all the modifications, equivalents, and replacements within the idea and technical scope of the invention. In the drawings, anything unnecessary for describing the invention will be omitted for clarity, and also like reference numerals in the drawings denote like elements.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a perspective view of a display device according to an exemplary embodiment of the invention.

Referring to FIG. 1, a display device DD may display an image through a display area DA. The display device DD may be applied to small and medium sized electronic devices such as a tablet personal computer ("PC"), a smartphone, a vehicle navigation unit, a camera, a center information display ("CID") provided to a vehicle, wristwatch type electronic devices, a personal digital assistant ("PDA"), a portable multimedia player ("PMP"), a game console and various electronic devices such as a television, an outdoor billboard, a monitor, a personal computer, and a notebook computer. Theses are only exemplary embodiments, and other electronic devices may be adoptable when they are not deviated from a concept of the invention.

Figure 2:
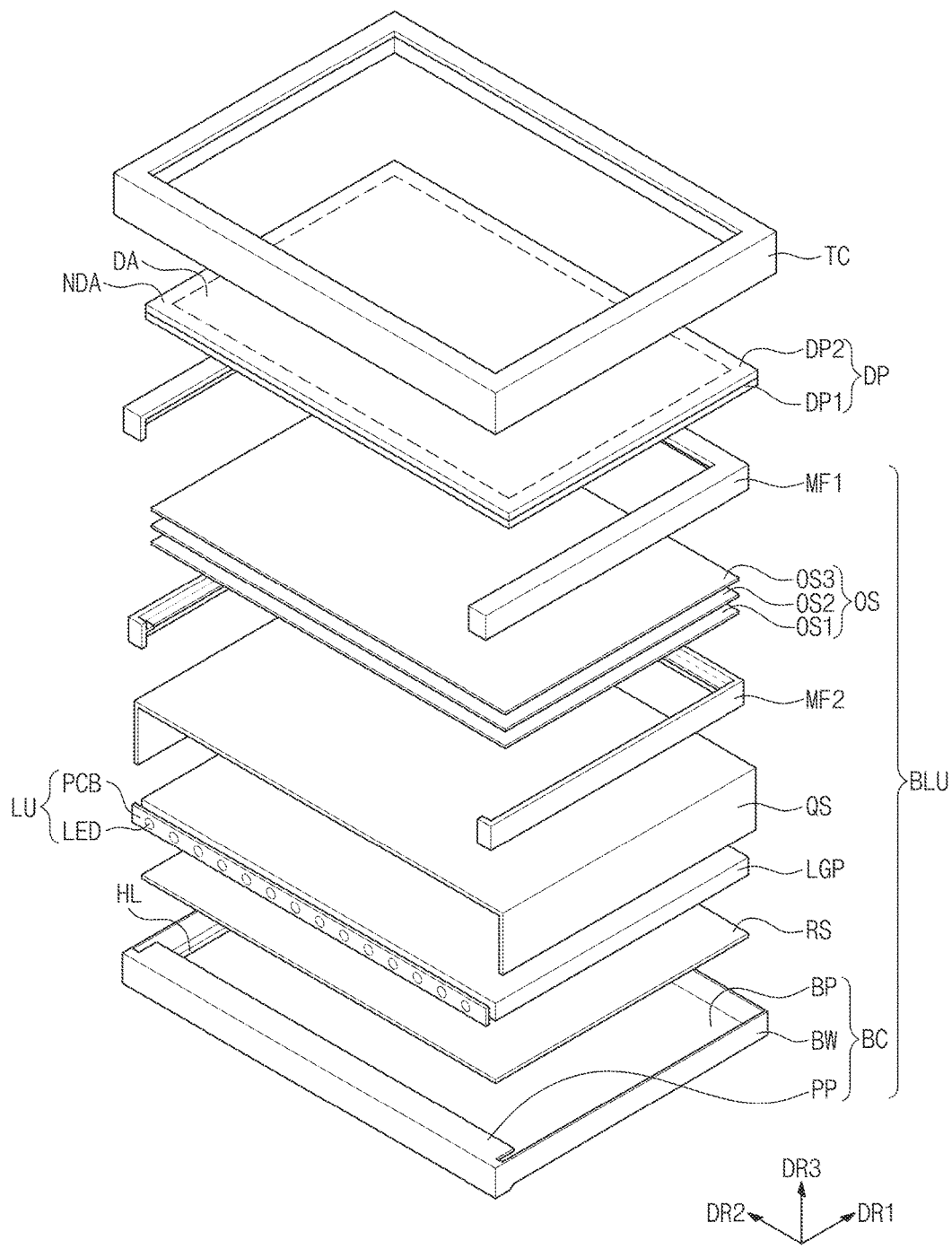
FIG. 2 is an exploded perspective view of an exemplary embodiment of the display device according to the invention.

FIG. 2 is an exploded perspective view of the display device according to an exemplary embodiment of the invention.

Referring to FIG. 2, the display device DD may include a top chassis TC, a display panel DP, and a backlight unit BLU.

The display panel DP generates an image corresponding to inputted image data. The display panel DP according to an exemplary embodiment is not especially limited thereto, and various types such as a liquid crystal panel, a plasma display panel, an electrophoresis display panel, and an electrowetting display panel may be adopted. In an exemplary embodiment, the display panel DP including a liquid crystal display panel will be described as an example.

The display panel DP may include a first substrate DP1, a second substrate DP2 facing the first substrate DP1, and a liquid crystal layer (not shown) disposed between the first substrate DP1 and the second substrate DP2. The liquid crystal layer may include a plurality of liquid crystal molecules changing their orientation states according to an electric field generated between the first substrate DP1 and the second substrate DP2. Although not separately shown, a pair of polarizing plates (not shown) may be disposed on upper and lower portions of the display panel DP.

A display surface of the display panel DP may include a display area DA and a non-display area NDA. The display area DA is an area for displaying an image, and the non-display area NDA is an area that surrounds the display area DA and does not display an image.

The backlight unit BLU may provide light to the display panel DP. The backlight unit BLU may include a light source unit LU, a light guide plate LGP, a wavelength conversion sheet QS, optical sheets OS, a reflective sheet RS, and a bottom chassis BC.

The light source unit LU may be disposed on one side of the light guide plate LGP. The light source unit LU may include a light source LED and a printed circuit board PCB. The light source LED may be disposed (e.g., mounted) on the printed circuit board PCB to receive a driving voltage from the printed circuit board PCB. The light source LED that receives the driving voltage may provide light to the light guide plate LGP. Although not shown, in an exemplary embodiment, the light source unit LU may further include an extrusion bar that is attached to a rear surface of the printed circuit board PCB. The extrusion bar may release heat generated from the printed circuit board PCB and the light source LED to the outside.

The light guide plate LGP may receive light from the light source LED to guide the provided light toward the display panel DP. An exemplary embodiment of the invention is not limited to the material constituting the light guide plate LGP. In an exemplary embodiment, the light guide plate LGP may include at least one of polyamide ("PA"), polymethyl methacrylate ("PMMA"), methacrylate styrene ("MS"), and polycarbonate ("PC"), for example.

The wavelength conversion sheet QS may be disposed between the light guide plate LGP and the display panel DP. The wavelength conversion sheet QS may be bent to cover at least three surfaces of the light guide plate LGP. Detailed description for this will be explained in FIG. 3.

The wavelength conversion sheet QS may convert a wavelength of light provided from the light source LED. The wavelength conversion sheet QS may include a wavelength conversion material for converting the wavelength of the light provided from the light source LED. In an exemplary embodiment, the wavelength conversion material may be a quantum dot, for example. However, the invention is not limited to the material of the wavelength conversion material. The wavelength conversion material may include a material converting a wavelength of provided light to a different wavelength. In an exemplary embodiment, the wavelength conversion material may be a phosphor, for example. According to an exemplary embodiment, the light source LED may provide blue light, for example. However, the invention is not limited thereto, and the light source LED may provide various other colors. The light provided from the light source LED may pass through the wavelength conversion sheet QS, and then be converted to white light, for example, and provided to the display panel DP.

The optical sheets OS may be disposed between the wavelength conversion sheet QS and the display panel DP. The optical sheets OS may include a diffusion sheet OS1, a prism sheet OS2, and a protective sheet OS3. The diffusion sheet OS1 may diffuse light and the prism sheet OS2 may collect the light diffused by the diffusion sheet OS1 to allow its progress direction to approach to a normal direction of the display panel DP. The protective sheet OS3 may protect the prism sheet OS2 from an external shock. In an exemplary embodiment, although the optical sheets OS include one piece of the diffusion sheet OS1, one piece of the prism sheet OS2, and one piece of the protective sheet OS3, the invention is not limited thereto. In an exemplary embodiment, in another exemplary embodiment of the invention, at least one of the diffusion sheet OS1, the prism sheet OS2, and the protective sheet OS3 may be provided in plurality to overlap each other, and, when necessary, at least one of the sheets may be omitted.

The reflective sheet RS may be disposed between the light guide plate LGP and the bottom chassis BC. The reflective sheet RS may reflect light leaked from the light guide plate LGP to allow the leaked light to be reincident to the light guide plate LGP. However, the reflective sheet RS may be omitted in another exemplary embodiment of the invention. In an exemplary embodiment, a light reflective material may be applied onto the bottom chassis BC to serve as the reflective sheet RS. However, the invention is not limited to the material of the light reflective material.

The bottom chassis BC may accommodate the optical sheets OS, the wavelength conversion sheet QS, the light guide plate LGP, and the light source unit LU.

The bottom chassis BC may include a bottom part BP, a sidewall part BW extending from the bottom part BP, and a cover part PP extending from the sidewall part BW in a direction parallel to the bottom part BP to cover the light source unit LU. A hole HL extending in a first direction DR1 may be defined in the bottom part BP of the bottom chassis BC. The bent wavelength conversion sheet QS may be inserted into the hole HL.

Although the backlight unit BLU may further include a first mold frame MF1 and a second mold frame MF2, an exemplary embodiment of the invention is not limited thereto.

The first mold frame MF1 and the second mold frame MF2 may be disposed adjacent to the sidewall part BW of the bottom chassis BC to overlap the non-display area NDA on a plane. The first mold frame MF1 may support the non-display area NDA of the display panel DP, and the second mold frame MF2 may support the optical sheets OS. Unlike the exemplary embodiment illustrated in FIG. 2, according to another exemplary embodiment of the invention, the first mold frame MF1 and the second mold frame MF2 may be unitary with each other, and at least one of the first mold frame MF1 and the second mold frame MF2 may be omitted.

The top chassis TC may cover the non-display area NDA. The top chassis TC may be bent and coupled to the sidewall part BW of the bottom chassis BC. Unlike the illustrated exemplary embodiment of the invention, according to another exemplary embodiment of the invention, the top chassis TC may be omitted.

Figure 3:
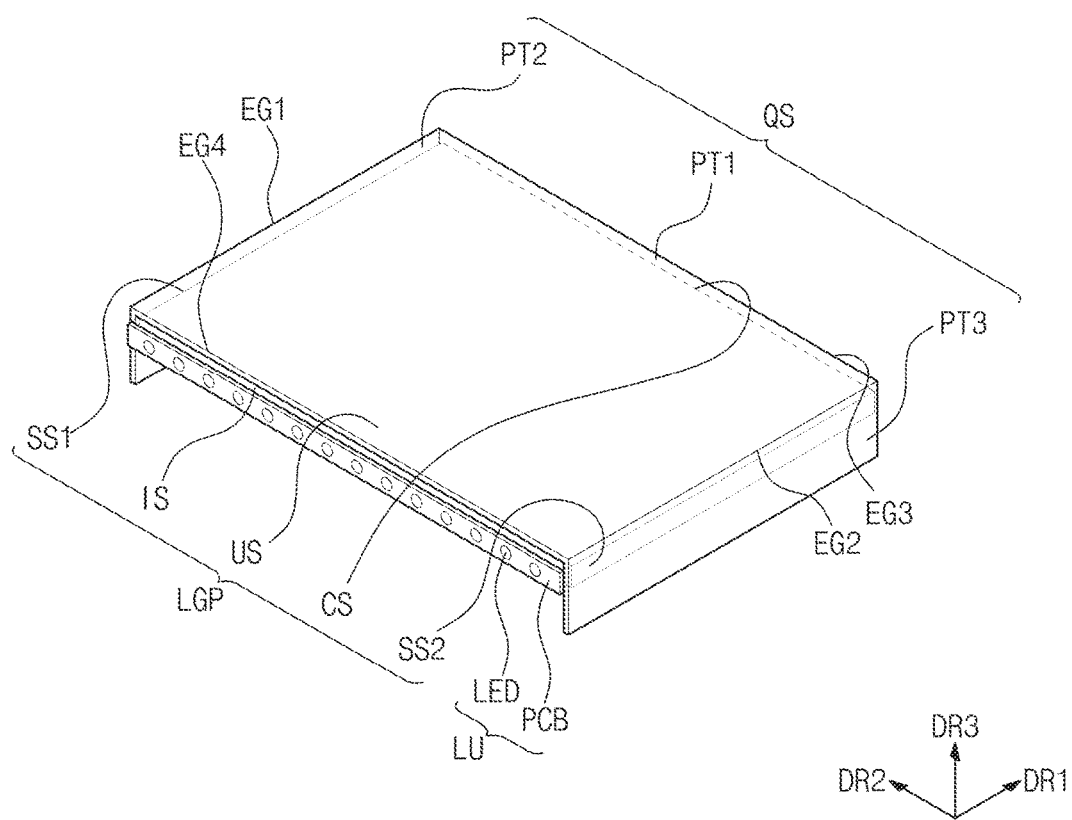
FIG. 3 is a partial perspective view of an exemplary embodiment of a backlight unit according to the invention.

FIG. 3 is a partial perspective view of the backlight unit according to an exemplary embodiment of the invention. FIG. 3 illustrates the wavelength conversion sheet QS, the light guide plate LGP, and the light source unit LU of the backlight unit BLU (refer to FIG. 2).

The light guide plate LGP may include an upper surface US, a first side surface SS1, a second side surface SS2, a third side surface IS, and a fourth side surface CS.

In an exemplary embodiment, the upper surface US may have a rectangular shape, for example, having two edges extending in the first direction DR1 and two edges extending in a second direction DR2 crossing the first direction DR1. Each of the first side surface SS1, the second side surface SS2, the third side surface IS, and the fourth side surface CS may extend from the upper surface US in a direction parallel to a third direction DR3 that is perpendicular to the first direction DR1 and the second direction DR2.

The first side surface SS1 and the second side surface SS2 may be substantially parallel to a plane defined by the first direction DR1 and the third direction DR3, and the third side surface IS and the fourth side surface CS may be substantially parallel to a plane defined by the second direction DR2 and the third direction DR3. The third side surface IS may face the light source unit LU and be defined as a light incident surface. The fourth side surface CS may face the third side surface IS and be defined as an opposite surface.

The wavelength conversion sheet QS may include a first portion PT1, a second portion PT2, and a third portion PT3.

The first portion PT1 may cover the upper surface US of the light guide plate LGP. The first portion PT1 may include a first edge EG1, a second edge EG2, a third edge EG3, and a fourth edge EG4. Each of the first edge EG1 and the second edge EG2 may extend in the first direction DR1. The first edge EG1 and the second edge EG2 may be spaced apart from each other in the second direction DR2. Each of the third edge EG3 and the fourth edge EG4 may extend in the second direction DR2. The third edge EG3 and the fourth edge EG4 may be spaced apart from each other in the first direction DR1. The third edge EG3 may be connected to one end of the first edge EG1 and one end of the second edge EG2, and the fourth edge EG4 may be connected to an opposite end of the first edge EG1 and an opposite end of the second edge EG2.

The second portion PT2 may extend from the first edge EG1 and cover the first side surface SS1. The third portion PT3 may extend from the second edge EG2 and cover the second side surface SS2. In the drawings, each of the second portion PT2 and the third portion PT3 has a length in the third direction DR3, which is greater than a thickness of the light guide plate LGP in the third direction DR3.

According to an exemplary embodiment, the wavelength conversion sheet QS covers the first and second side surfaces SS1 and SS2 of the light guide plate LGP as well as the upper surface of the light guide plate LGP. Thus, a phenomenon in which blue light emitted from the light source ("LED") is not converted to be seen may be reduced. Accordingly, color difference of light provided by the backlight unit BLU (refer to FIG. 2) may be reduced.

Figure 4:
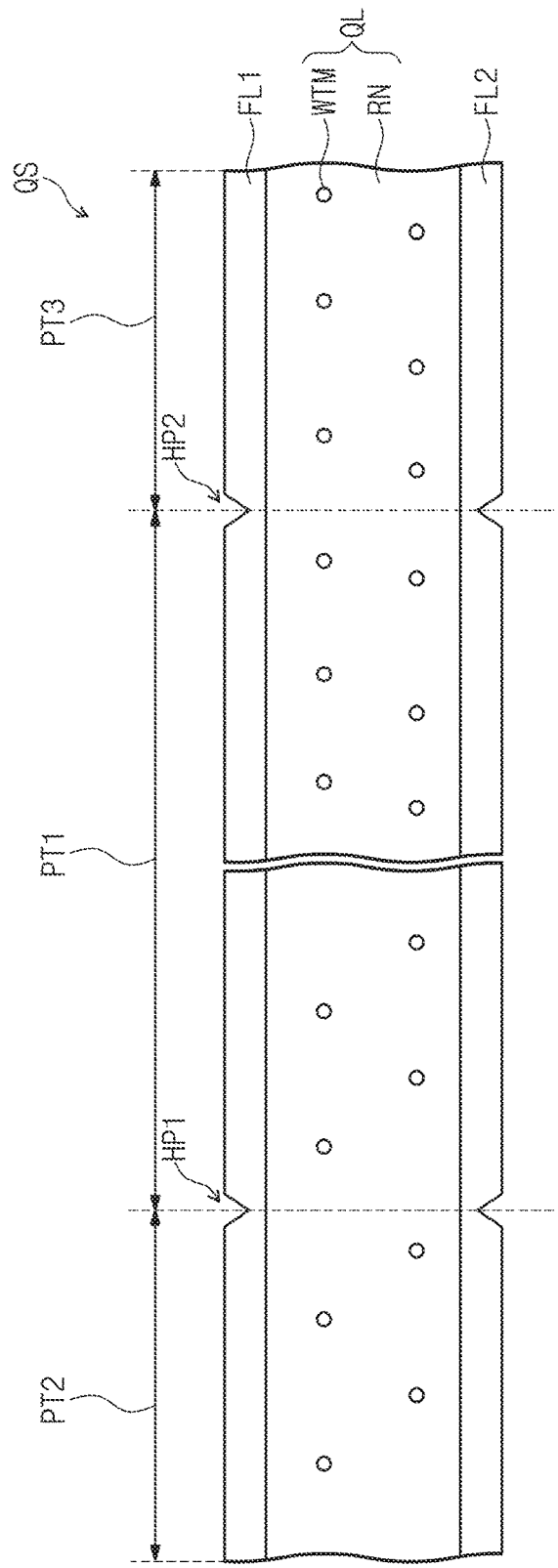
FIG. 4 is a partially enlarged view of a wavelength conversion sheet of FIG. 3.
Figure 5:
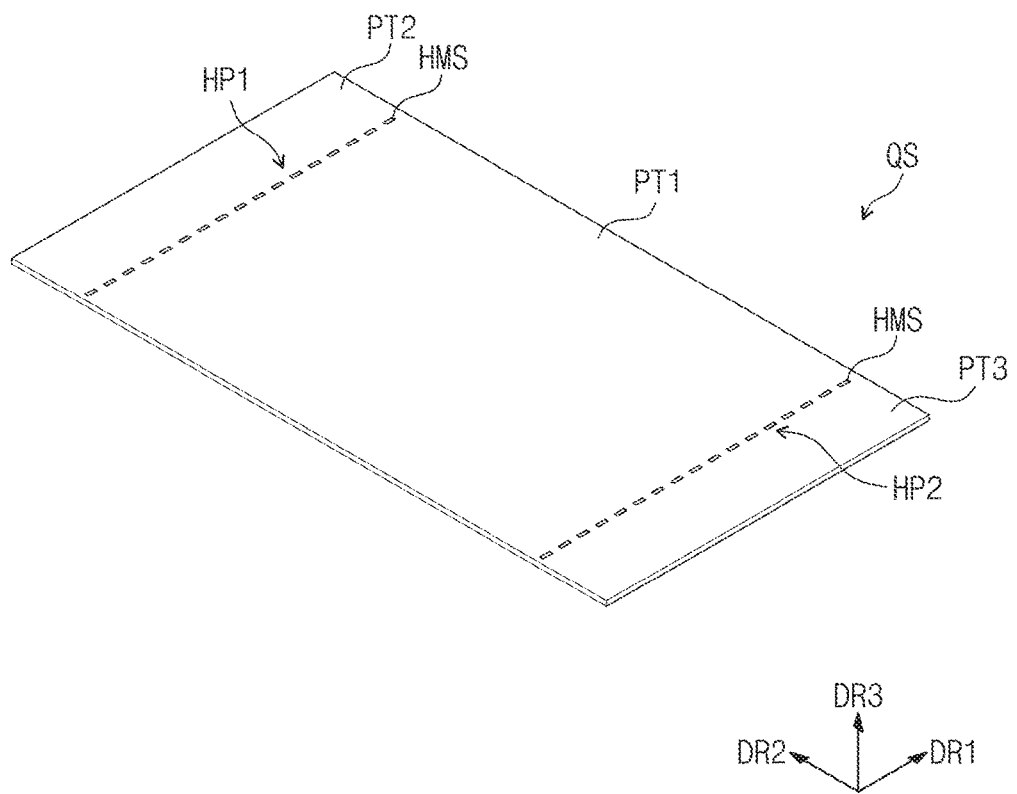
FIG. 5 is a perspective view of an exemplary embodiment of a wavelength conversion sheet according to the invention.

FIG. 4 is a partially enlarged perspective view of the wavelength conversion sheet of FIG. 3, and FIG. 5 is a perspective view of the wavelength conversion sheet according to an exemplary embodiment of the invention.

Referring to FIGS. 4 and 5, the wavelength conversion sheet QS may include a first film FL1, a wavelength conversion layer QL, and a second film FL2. The wavelength conversion layer QL may be disposed between the first film FL1 and the second film FL2.

The wavelength conversion layer QL may include base resin RN and a wavelength conversion material WTM. In an exemplary embodiment, the base resin RN may include at least one of the materials including epoxy, silicone, polystyrene, and acrylate, for example, but the invention is not limited thereto. In an exemplary embodiment, the base resin RN may be replaced by a material serving as a dispersion material.

The wavelength conversion material WTM may be dispersed in the base resin RN. According to an exemplary embodiment of the invention, the wavelength conversion material WTM may be a quantum dot. Unlike the above-described exemplary embodiment, according to another exemplary embodiment of the invention, the wavelength conversion material WTM may further include a phosphor for wavelength conversion as well as the quantum dot. The first film FL1, the second film FL2, and the base resin RN may protect the wavelength conversion material WTM against moisture and oxygen, for example.

Groove portions HP1 and HP2 may be provided in at least one of the first film FL1 and the second film FL2 of the wavelength conversion sheet QS. Although the groove portions HP1 and HP2 are provided to all of the first film FL1 and the second film FL2 in FIG. 4, according to another exemplary embodiment of the invention, the groove portions HP1 and HP2 may be provided to any one of the first film FL1 and the second film FL2 or may not be provided to all of the first film FL1 and the second film FL2.

The first groove portion HP1 may be provided to a boundary between the first and second portions PT1 and PT2 of the wavelength conversion sheet QS, and the second groove portion HP2 may be provided to a boundary between the first and third portions PT1 and PT3. The first groove portion HP1 may overlap the first edge EG1 (refer to FIG. 3) of the first portion PT1, and the second groove portion HP2 may overlap the second edge EG2 (refer to FIG. 3) of the first portion PT1. The first groove portion HP1 and the second groove portion HP2 may have a shape recessed from a surface of each of the first film FL1 and the second film FL2. The second portion PT2 and the third portion PT3 may be more easily bent from the first portion PT1 by the first groove portion HP1 and the second groove portion HP2.

Each of the first groove portion HP1 and the second groove portion HP2 may include a plurality of recessed grooves HMS. The plurality of recessed grooves HMS is arranged in the first direction DR1. Two recessed grooves, which are adjacent to each other, of the plurality of recessed grooves HMS may be spaced apart from each other. Although the plurality of recessed grooves HMS has the same size as each other in FIG. 5, an exemplary embodiment of the invention is not limited thereto. In an exemplary embodiment, each of the plurality of recessed grooves HMS may have a different size, or some of the plurality of recessed grooves HMS may have the same size as each other and some of the plurality of recessed grooves HMS may have different size from each other, for example.

Figure 6:
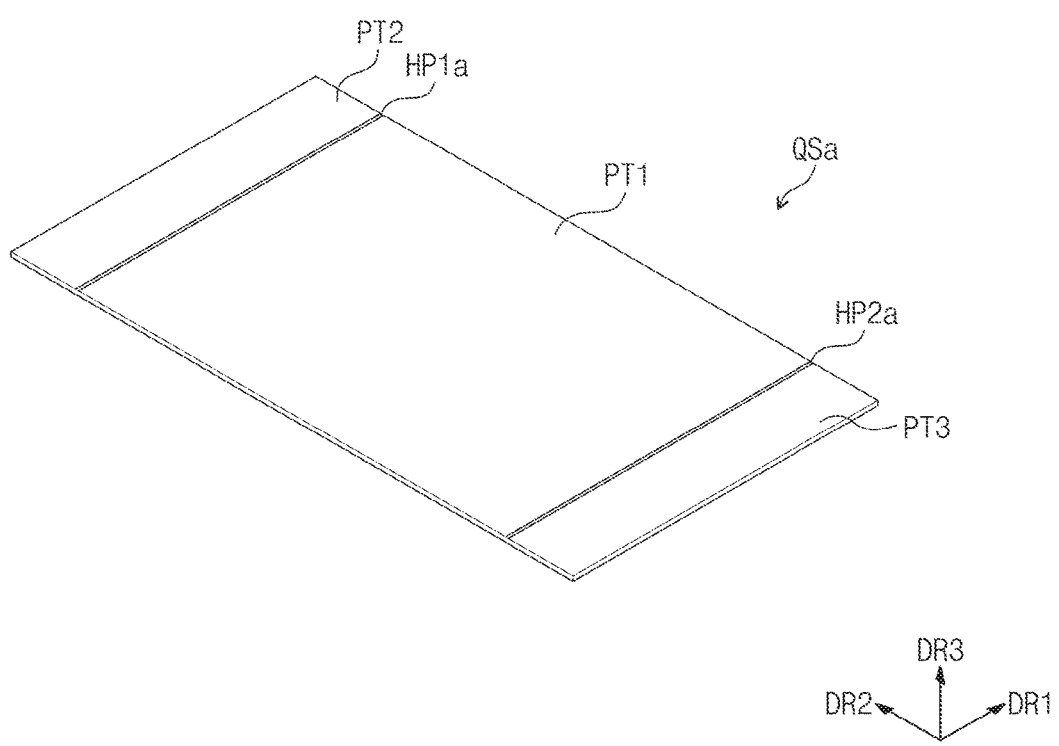
FIG. 6 is a perspective view of an exemplary embodiment of a wavelength conversion sheet according to the invention.

FIG. 6 is a perspective view of a wavelength conversion sheet according to an exemplary embodiment of the invention. FIG. 6 illustrates a wavelength conversion sheet QSa that is not bent. Referring to FIG. 6, each of a first groove portion HP1a and a second groove portion HP2a extends in the first direction DR1. The second and third portions PT2 and PT3 of the wavelength conversion sheet QSa may be bent in parallel to the third direction DR3 to surround a side surface of the light guide plate LGP (refer to FIG. 2).

Figure 7:
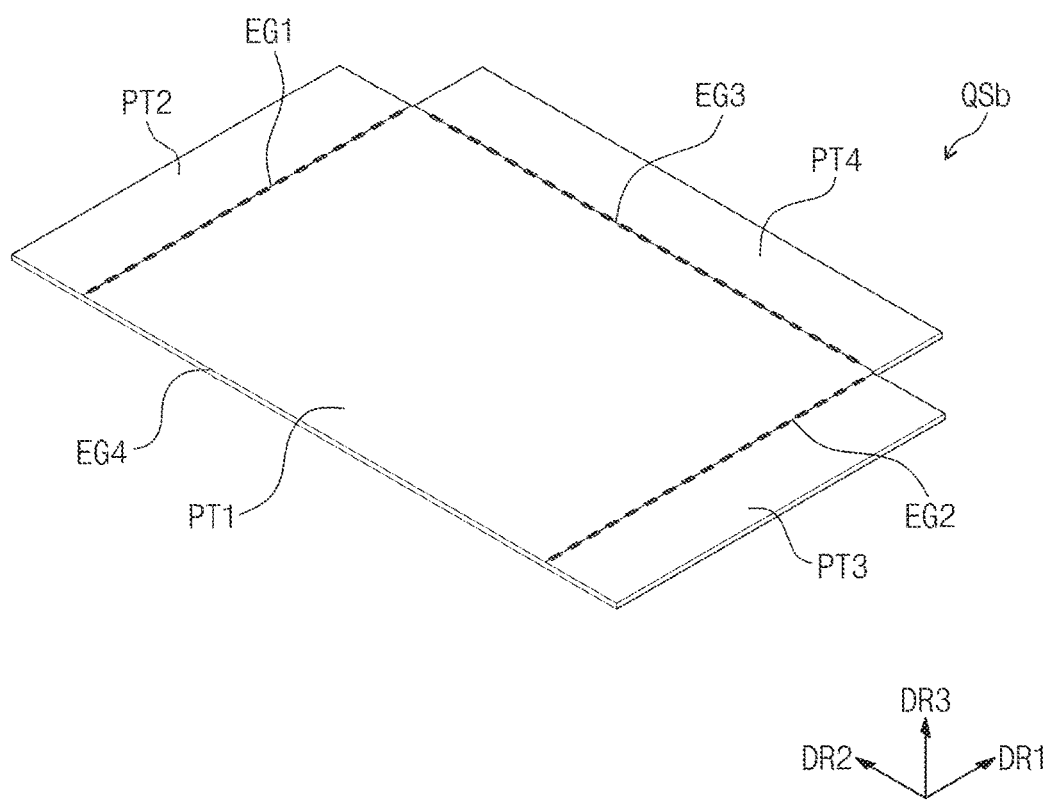
FIG. 7 is a perspective view of an exemplary embodiment of a wavelength conversion sheet according to the invention.

FIG. 7 is a perspective view of a wavelength conversion sheet according to an exemplary embodiment of the invention.

Referring to FIGS. 3 and 7, when a wavelength conversion sheet QSb is compared with the wavelength conversion sheet QS in FIG. 3, they are different in that the wavelength conversion sheet QSb further includes a fourth portion PT4.

The fourth portion PT4 extends from the third edge EG3 of the first portion PT1. The fourth portion PT4 may cover the fourth side surface CS of the light guide plate LGP. When the wavelength conversion sheet QSb in FIG. 7 is used, the wavelength conversion sheet QSb may cover the four surfaces the light guide plate LGP.

Figure 8:
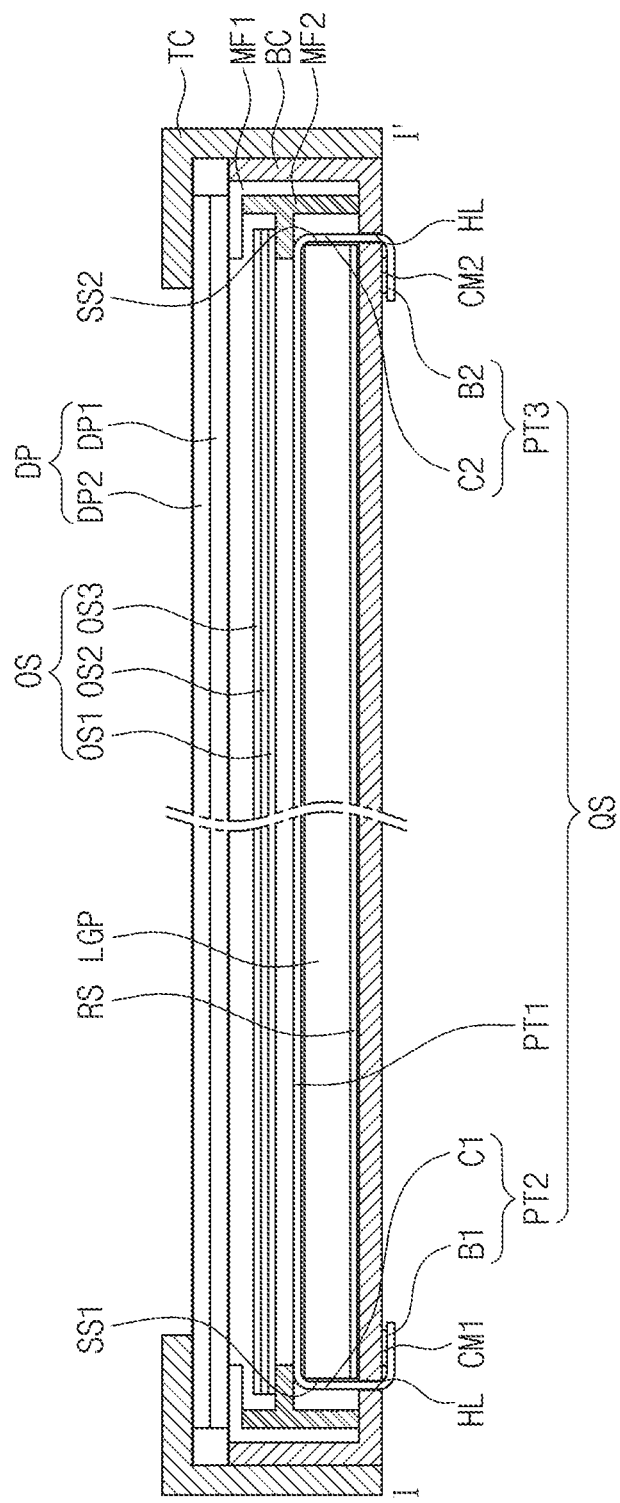
FIG. 8 is a cross-sectional view of a display device taken along line I-I' of FIG. 1.

FIG. 8 is a cross-sectional view of the display device taken along line I-I' of FIG. 1.

Referring to FIG. 8, the wavelength conversion sheet QS may pass through the hole HL defined in the bottom chassis BC. The wavelength conversion sheet QS passing through the hole HL of the bottom chassis BC may be connected to a rear surface of the bottom chassis BC.

The second portion PT2 of the wavelength conversion sheet QS may include a first cover section C1 and a first bonding section B1, and the third portion PT3 of the wavelength conversion sheet QS may include a second cover section C2 and a second bonding section B2.

The first cover section C1 covers the first side surface SS1 of the light guide plate LGP and extends toward the bottom chassis BC, and the second cover section C2 covers the second side surface SS2 of the light guide plate LGP and extends toward the bottom chassis BC. Each of the first bonding section B1 and the second bonding section B2 is inserted into the hole HL defined in the bottom chassis BC and connected to the rear surface of the bottom chassis BC.

A first coupling member CM1 may be disposed between the first bonding section B1 and the rear surface of the bottom chassis, and a second coupling member CM2 may be disposed between the second bonding section B2 and the rear surface of the bottom chassis. The first coupling member CM1 and the second coupling member CM2 may be a double-sided tape.

Figure 9:
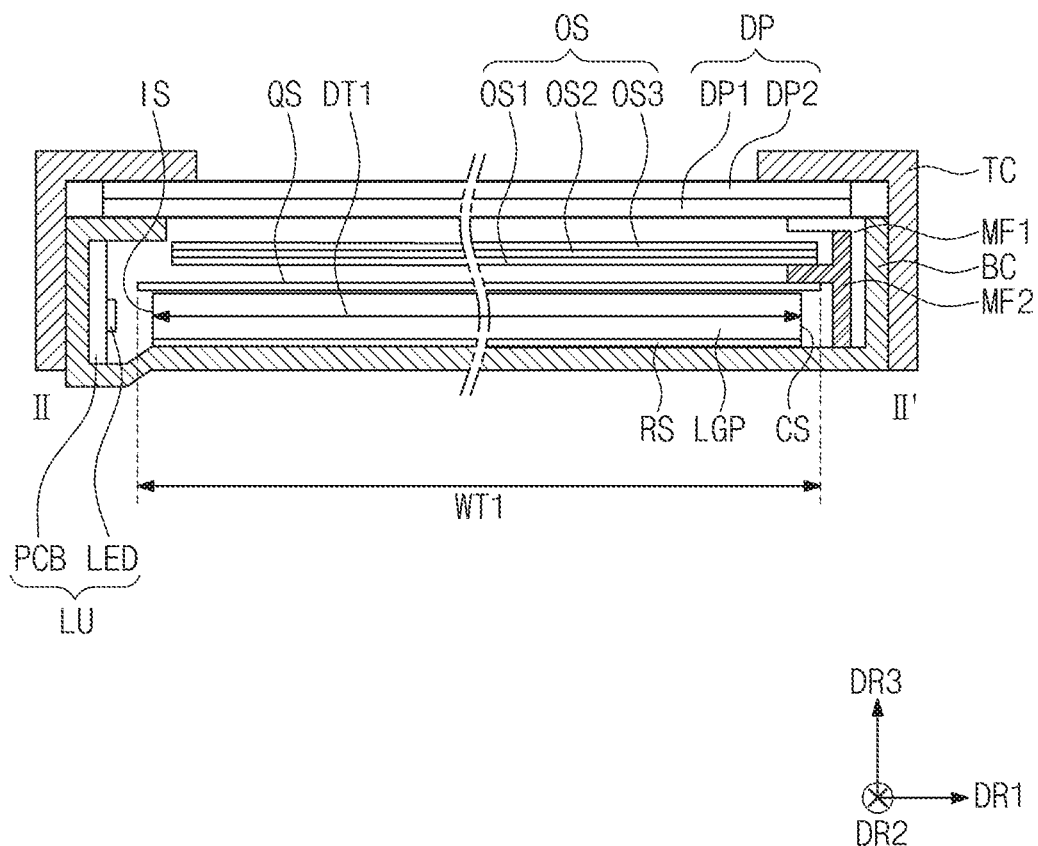
FIG. 9 is a cross-sectional view of the display device taken along line II-II' of FIG. 1.

FIG. 9 is a cross-sectional view of the display device taken along line II-II' of FIG. 1.

Referring to FIG. 9, the wavelength conversion sheet QS may have an area greater than the upper surface US (refer to FIG. 3) of the light guide plate LGP.

The wavelength conversion sheet QS may have a first width WT1 in the first direction DR1, which is greater than a first distance DT1 between the third and fourth side surfaces IS and CS of the light guide plate LGP. Accordingly, a phenomenon in which light emitted through the light guide plate LGP is not converted to allow the non-converted light to be seen may be reduced.

According to an exemplary embodiment, two edges of four edges of the wavelength conversion sheet QS are disposed on the rear surface of the bottom chassis BC, and the rest two edges are disposed outside the light guide plate LGP. Accordingly, although the wavelength conversion material in the wavelength conversion sheet QS is exposed to moisture and oxygen to change a color of the edge portion of the wavelength conversion sheet QS, increase in color difference of the light provided by the backlight unit BLU (refer to FIG. 2) may be prevented.

Figure 10:
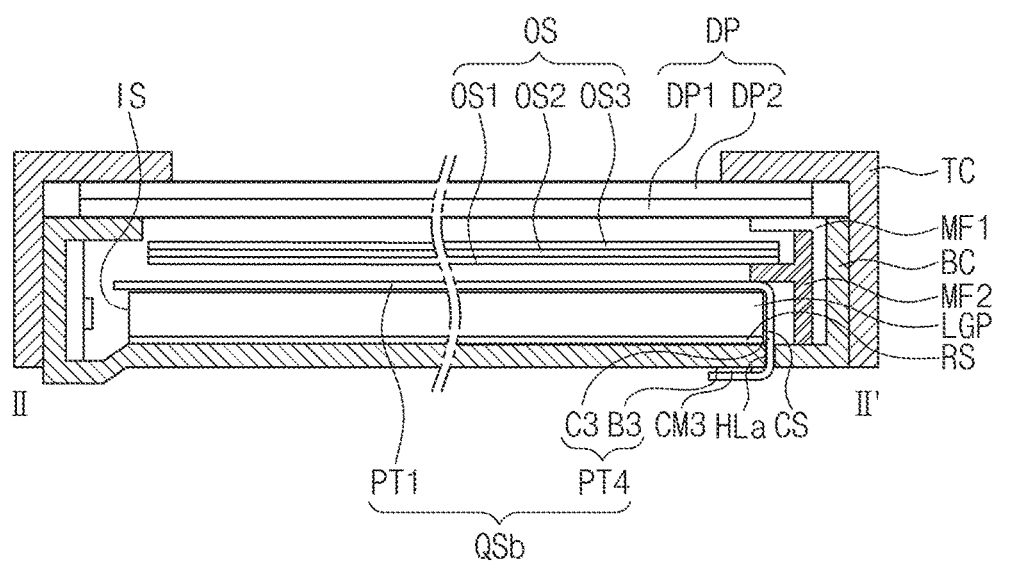
FIG. 10 is a cross-sectional view of a display device taken along line II-II' of FIG. 1.
Figure 10:
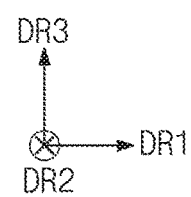

FIG. 10 is a cross-sectional view of a display device taken along line I-I' of FIG. 1. FIG. 10 is a cross-sectional view illustrating that the wavelength conversion sheet QSb in FIG. 7 is applied.

Referring to FIG. 10, the fourth portion PT4 may include a third cover section C3 and a third bonding section B3. The third cover section C3 covers the fourth side surface CS of the light guide plate LGP and extends toward the bottom chassis BC. A through-hole HLa through which the third bonding section B3 passes and extending in the second direction DR2 may be defined in the bottom chassis BC.

The third bonding section B3 may pass through the through-hole HLa defined in the bottom chassis BC and be bonded to the rear surface of the bottom chassis BC. A third coupling member CM3 may be disposed between the third bonding section B3 and the rear surface of the bottom chassis BC. In an exemplary embodiment, the third coupling member CM3 may be a double-sided tape of which both sides have an adhesion force, for example.

Figure 11:
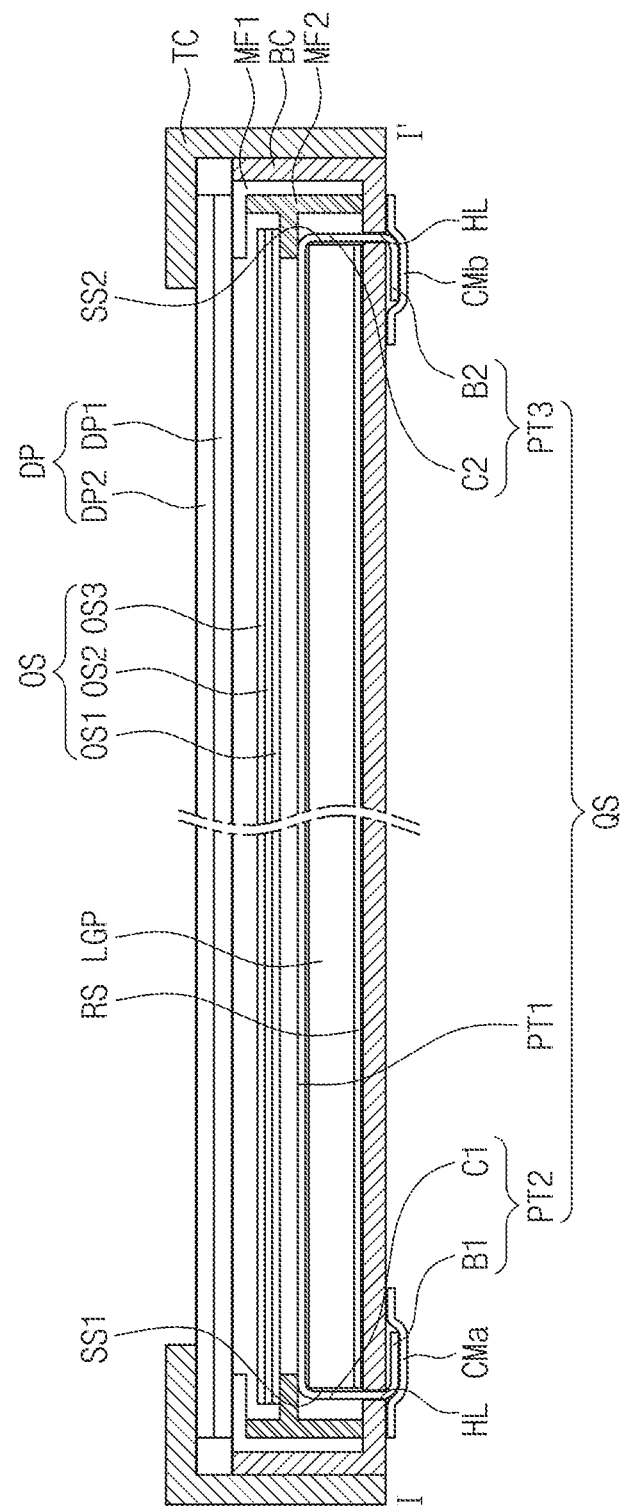
FIG. 11 is a cross-sectional view of a display device taken along line I-I' of FIG. 1.

FIG. 11 is a cross-sectional view of a display device taken along line II-II' of FIG. 1.

Referring to FIG. 11, when FIG. 11 is compared with FIG. 8, there is difference in a first coupling member CMa and a second coupling member CMb.

According to an exemplary embodiment, the first coupling member CMa may cover the first bonding section B1 and be bonded to the rear surface of the bottom chassis BC, and the second coupling member CMb may cover the second bonding section B2 and be bonded to the rear surface of the bottom chassis BC. In an exemplary embodiment, the first coupling member CMa and the second coupling member CMb may be a double-sided tape of which one surface has an adhesion force, for example.

Each of the first coupling member CMa and the second coupling member CMb may cover the hole HL defined in the bottom chassis BC as well as the first bonding section B1 and the second bonding section B2. In this case, foreign substances such as dust may be prevented from being introduced into the bottom chassis BC through the hole of the bottom chassis BC.

Figure 12:
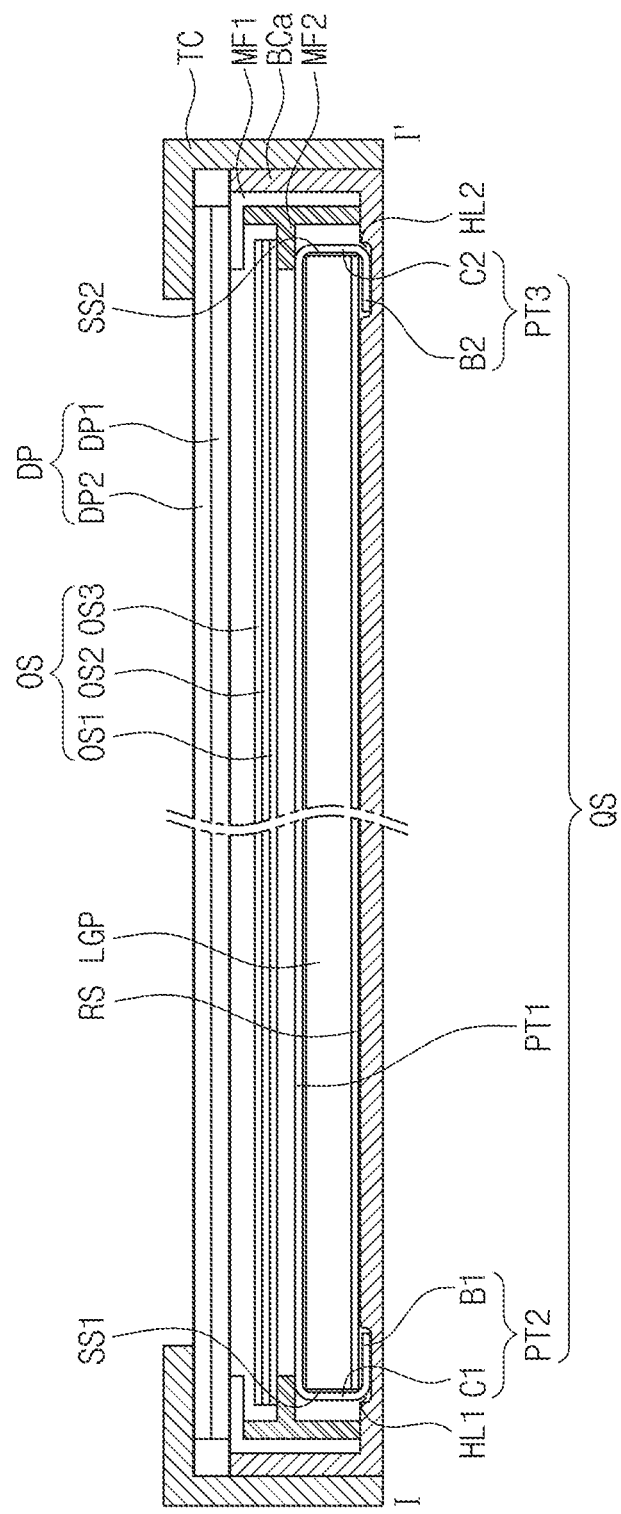
FIG. 12 is a cross-sectional view of a display device taken along line I-I' of FIG. 1.

FIG. 12 is a cross-sectional view of a display device taken along line II-II' of FIG. 1.

Referring to FIG. 12, there is difference in a shape of a bottom chassis BCa when compared with FIG. 8. The hole HL (refer to FIG. 8) in FIG. 8 may not be defined in the bottom chassis BCa in FIG. 12. Accordingly, the first and second bonding sections B1 and B2 of the wavelength conversion sheet QS may not pass through the bottom chassis BCa.

The first bonding section B1 and second bonding section B2 are inserted into a rear surface of the reflective sheet RS, and the first bonding section B1 and second bonding section B2 are disposed between the reflective sheet RS and an upper surface of the bottom chassis BCa. According to an exemplary embodiment, a first recessed pattern HL1 in which the first bonding section B1 is accommodated and a second recessed pattern HL2 in which the second bonding section B2 is accommodated are provided to the bottom chassis BCa. Although each of the first recessed pattern HL1 and the second recessed pattern HL2 may have a depth less than a width of the bottom chassis BCa, an exemplary embodiment of the invention is not limited thereto. In an exemplary embodiment, the bottom chassis BCa may have a flat bottom part in another exemplary embodiment of the invention.

Also, although not shown, a member for fixing the wavelength conversion sheet QS may be further disposed in the first and second recessed patterns HL1 and HL2 of the bottom chassis BC. In an exemplary embodiment, an adhesion material may be applied to the first and second recessed patterns HL1 and HL2 to couple each of the first and second recessed patterns HL1 and HL2 to the bottom chassis BCa.

The wavelength conversion sheet is bent so that the two edges of the four edges of the wavelength conversion sheet are coupled to the bottom chassis and the rest two edges are disposed outside the light guide plate. Thus, although the wavelength conversion material in the wavelength conversion sheet is exposed to moisture and oxygen to change the color of the edge portion of the wavelength conversion sheet, increase in the color difference of the light provided by the backlight unit may be prevented.

It will be apparent to those skilled in the art that various modifications and variations can be made in the invention. Thus, it is intended that the invention covers the modifications and variations of this invention provided they come within the scope of the appended claims and their equivalents. Hence, the real protective scope of the invention shall be determined by the technical scope of the accompanying claims.

What is claimed is:

1. A display device comprising:
a display panel which displays an image;
a light guide plate disposed below the display panel;
a light source unit which provides light to the light guide plate;
a wavelength conversion sheet disposed between the display panel and the light guide plate, the wavelength conversion sheet having a wavelength conversion material which converts a wavelength of the light; and
a bottom chassis which accommodates the light guide plate, the light source unit, and the wavelength conversion sheet,
wherein the wavelength conversion sheet comprises:
a first portion which covers an upper surface, which faces the display panel, of the light guide plate, the first portion comprising a first edge extending in a first direction and a second edge facing the first edge and extending in the first direction;
a second portion which extends directly from the first edge toward the bottom chassis, is directly coupled to the bottom chassis and covers a first side surface of the light guide plate, the second portion and the first portion share the first edge defining the second portion and the first portion; and
a third portion which extends directly from the second edge toward the bottom chassis, is directly coupled to the bottom chassis and covers a second side surface of the light guide plate, the third portion and the first portion share the second edge defining the third portion and the first portion.

2. The display device of claim 1, wherein
the light guide plate further comprises a third side surface which connects one end of the first side surface to one end of the second side surface and a fourth side surface which connects an opposite end of the first side surface to an opposite end of the second side surface, and
the light source unit faces the third side surface.

3. The display device of claim 2, wherein
a first hole extending in the first direction and through which the second portion passes and a second hole extending in the first direction and through which the third portion passes are defined in the bottom chassis.

4. The display device of claim 3, wherein
the second portion is divided into a first cover section which covers the first side surface and a first bonding section passing through the first hole and bonded to a rear surface of the bottom chassis, and the third portion is divided into a second cover section which covers the second side surface and a second bonding section passing through the second hole and bonded to the rear surface of the bottom chassis.

5. The display device of claim 4, further comprising:
a first coupling member and a second coupling member, which are bonded to the rear surface of the bottom chassis,
wherein the first coupling member bonds the first bonding section to the rear surface of the bottom chassis, and the second coupling member bonds the second bonding section to the rear surface of the bottom chassis.

6. The display device of claim 5, wherein
the first coupling member is disposed between the rear surface of the bottom chassis and the first bonding section and bonds the first bonding section to the bottom chassis, and
the second coupling member is disposed between the rear surface of the bottom chassis and the second bonding section and bonds the second bonding section to the bottom chassis.

7. The display device of claim 5, wherein
the first coupling member covers the first bonding section and bonds the first bonding section to the bottom chassis, the second coupling member covers the second bonding section and bonds the second bonding section to the bottom chassis, the first bonding section is disposed between the rear surface of the bottom chassis and the first coupling member, and
the second bonding section is disposed between the rear surface of the bottom chassis and the second coupling member.

8. The display device of claim 2, wherein
a first groove portion and a second groove portion are defined in the wavelength conversion sheet, and
the first groove portion overlaps the first edge and has a recessed shape, and the second groove portion overlaps the second edge and has a recessed shape.

9. The display device of claim 8, wherein
each of the first groove portion and the second groove portion comprises a plurality of recessed grooves, and
the plurality of recessed grooves is arranged in the first direction, and two recessed grooves, which are adjacent to each other, of the plurality of recessed grooves are spaced apart from each other.

10. The display device of claim 8, wherein each of the first groove portion and the second groove portion comprises a groove extending in the first direction.

11. The display device of claim 2, wherein the wavelength conversion sheet further comprises:
a fourth portion extending from a third edge, which extends in a second direction crossing the first direction, of the first portion to cover the fourth side surface.

12. The display device of claim 11, wherein a third hole extending in the second direction and through which the fourth portion passes is defined in the bottom chassis.

13. The display device of claim 2, wherein
a distance between the third and fourth side surfaces of the light guide plate is a first distance, and
a first width, which is parallel to the first direction, of the wavelength conversion sheet is greater than the first distance.

14. The display device of claim 1, wherein the light provided by the light source unit is blue light, and the wavelength conversion material is a quantum dot.

15. A display device comprising:
a display panel;
a light guide plate disposed below the display panel;
a light source unit which provides light to the light guide plate;
a wavelength conversion sheet disposed between the display panel and the light guide plate; and
a bottom chassis which accommodates the light guide plate, the wavelength conversion sheet, and the light source unit on a front surface defining the bottom chassis,
wherein the wavelength conversion sheet surrounds at least one of side surfaces of the light guide plate and an upper surface of the light guide plate, passes through a hole defined in the bottom chassis, and is coupled to a rear surface opposite the front surface defining the bottom chassis.

16. The display device of claim 15, wherein
the side surfaces of the light guide plate comprise a light incident surface facing the light source unit, an opposite surface facing the light incident surface, a first side surface which connects the light incident surface to the opposite surface, and a second side surface facing the first side surface, and
the wavelength conversion sheet covers the first side surface and the second side surface and extends toward the bottom chassis.

17. The display device of claim 16, wherein
a distance between the light incident surface and the opposite surface is a first distance, and
a first width, which is parallel to the first direction, of the wavelength conversion sheet is greater than the first distance.

18. The display device of claim 15, further comprising a coupling member bonded to the rear surface of the bottom chassis,
wherein the coupling member bonds the wavelength conversion sheet passing through the hole to the rear surface of the bottom chassis.

19. A backlight unit comprising:
a light source unit which generates light;
a light guide plate which guides the light provided from the light source unit;
a wavelength conversion sheet which surrounds at least three surfaces of the light guide plate; and
a bottom chassis accommodating the light source unit, the light guide plate, and the wavelength conversion sheet, the bottom chassis including a bottom surface disposed below the light guide plate,
wherein the wavelength conversion sheet is directly coupled to the bottom chassis, and
wherein one of the three surfaces is a surface of the light guide plate facing the bottom surface.

20. The backlight unit of claim 19, wherein
at least two recessed patterns each of which extends in a predetermined direction are defined in the bottom chassis, and a portion of the wavelength conversion sheet is accommodated in each of the at least two recessed patterns and couples the wavelength conversion sheet to the bottom chassis.

* * * * *